United States Patent Office 3,152,909
Patented Oct. 13, 1964

3,152,909
FUMARIC ADIPIC ACID COMPOSITIONS
Stanley P. Raffensperger, Palos Park, and Thomas T. Takashima, La Grange, Ill., assignors to General Foods Corporation, White Plains, N.Y., a corporation of Delaware
No Drawing. Filed June 27, 1961, Ser. No. 119,780
18 Claims. (Cl. 99—78)

The following invention relates to an improved method of increasing the solubility rate of adipic acid and fumaric acid in cold water.

In the past, citric acid has been employed as an acidulant in dry beverage mixes capable of being dissolved in cold water. In addition to citric acid, such mixes usually contain other hydroscopic materials such as sugars and the like. Such compositions are relatively unstable if stored for extended periods of time since they readily absorb moisture and cake upon standing. The storage problem encountered with such dry beverage mixes has always been of great concern to those skilled in the art and in particular the storage problems encountered in warm, humid climates. Adipic and fumaric acids have many properties which make them desirable for commercial use in such products. However, such uses are limited due to the fact that both adipic and fumaric acids have a very low rate of solubility in cold water. While the dry beverage mixes of commerce must dissolve in cold water in less than one minute, the use of adipic or fumaric acid in such mixes in the past has been impossible due to the fact that adipic and fumaric acid do not dissolve rapidly in cold water, periods as long as twenty-four hours at times not being sufficient to put all of the adipic or fumaric acid into solution.

It is an object of this invention to prepare an adipic or fumaric acid composition which has an increased rate of solubility in cold water. It is a further object of this invention to prepare an adipic acid or fumaric acid composition which when used in cold water soluble products will not absorb substantial amounts of moisture upon standing and will be readily and easily soluble in cold water. It is a further object of this invention to prepare an adipic or fumaric acid composition which when used in cold water soluble beverage mixes will prevent the occurrence of chemical reactions during storage which cause degradation of the beverage flavor and color. It is still a further object of this invention to prepare an adipic or fumaric acid composition which when used in cold water soluble beverage mixes containing sucrose will prevent the undesirable inversion of the sucrose. Further objects of this invention will be apparent from a reading of the specification.

It has now been discovered that the rate of solubility of adipic acid and fumaric acid may be increased by mixing the acid with a polyethylene glycol fatty acid ester. It is not known exactly how or why these derivatives improve the rate of solubility of adipic and fumaric acid, but it is believed that these derivatives have a solubilizing effect over and above that effect obtained by reducing adipic or fumaric acid to a fine powder.

As used in the present invention, the term "acid" refers to an acid selected from the group consisting of adipic acid and fumaric acids.

While the addition of a polyethylene glycol fatty acid ester produces extremely satisfactory results, it has further been found that the addition of a small amount of propylene glycol enhances the effect of the polyethylene glycol fatty acid ester when in combination with the acid in that the level of the derivative required to effect a high rate of solubility is substantially reduced. While water soluble derivatives such as polyethylene glycol oleate may be employed, it is preferred to employ polyethylene glycol stearate.

In producing the acid compositions according to certain aspects of this invention, the acid is preferably ground to effect size reduction. Typically particle sizes of about 40 to 400 U.S. Standard Mesh are desirable and preferably a particle size of about 100–300 U.S. Standard Mesh.

For each part by weight of acid about 0.1 to 3% of polyethylene glycol fatty acid ester may be employed, and preferably 1.5%. The ground acid may then be mixed with polyethylene glycol stearate. Preferably, the amount of polyethylene glycol stearate will be in an amount sufficient to coat the acid particles but in an amount insufficient to cause the particles to clump together. The acid and polyethylene glycol stearate are blended and then ground to reduce the particle size so that the particles will pass through about a 100 to 400 U.S. Standard Mesh Screen and preferably 100% through a 300 U.S. Standard Mesh Screen. It is preferred when adding the polyethylene glycol stearate to the acid that the polyethylene glycol stearate be at a temperature of at least room temperature.

In the preferred embodiment, 0.7% polyethylene glycol stearate by weight of the acid, and about 0.1 to 1.0% and preferably 0.25% of propylene glycol by weight of the acid are added to the acid powder. It has been found that the propylene glycol assists in the coating of the acid with polyethylene glycol stearate and in addition permits a reduction in the amount of polyethylene glycol stearate which may be employed. Thus, in the case where polyethylene glycol stearate is employed without propylene glycol, it is necessary to employ about 0.1 to 3.0% polyethylene glycol stearate by weight of the acid, whereas if about 0.1 to 1.0% of propylene glycol by weight of the acid is employed in addition to the polyethylene glycol stearate, then it is only necessary to employ about 0.1 to 1.5% polyethylene glycol stearate by weight of the acid. Furthermore, the propylene glycol reduces the amount of dust produced when the preferred particle size of acid is such that it is necessary to finely grind the acid.

The following example illustrates one embodiment of the product invention, but it is to be understood that this example is for purposes of illustration only and that the invention is not limited thereto since various changes can be made by those skilled in the art without departing from its scope and spirit.

Five hundred pounds of adipic acid having a mesh size of 100 U.S. Standard Mesh was mixed with 3.5 pounds of polyethylene glycol stearate which had previously been mixed and blended at 120° F. The mixture of adipic acid, propylene glycol and polyethylene glycol stearate was well blended and then ground to reduce the size of the adipic acid particles to particles of a size which passed through a 200 U.S. Standard Mesh Screen.

The acid composition of the present invention may be employed wherever it is desired to utilize adipic or fumaric acid in cold water where a relatively rapid rate of solubility is required. One such use is in fruit flavored beverage mixes which are dissolved in very cold water. Such mixes typically contain sugars, an edible acid, flavoring and coloring. A typical fruit flavored beverage mix composition as employed in this invention is:

Adipic acid _____ 20.00–35.00 parts by weight.
Fruit flavor (natural or imitation-fixed in gum arabic) _____ .25–1.75 parts by weight.
Color (FD & C—certified food coloring) _____ .10–1.25 parts by weight.
Dextrose hydrate or sucrose_ Sufficient to bring the total parts by weight to 100.

17.7 grams of the above mix may be dissolved in two quarts of cold water and to this solution may be added 1–1.5 cups of sugar to prepare a fruit flavored beverage. As an alternative, the sugar may be incorporated in the dry beverage mix rather than being added after the mix has been dissolved.

Fruit flavored beverage mixes which contain the acid composition of the present invention in combination with a hydroscopic sugar such as sucrose or the like exhibit little or no caking after extended periods of storage, and after such time can be dissolved in cold water within several minutes.

While the present invention has been described by means of a specific example the invention is not limited thereto, reference being had to the appended claims for a definition of the scope of the invention.

What is claimed is:

1. A method of improving the cold water solubility rate of an acid selected from the group consisting of adipic and fumaric acids which comprises mixing a water soluble ester taken from the group consisting of polyethylene glycol stearate and polyethylene glycol oleate with said acid, said acid having a particle size of 40–400 U.S. Standard Mesh, and said fatty acid ester being employed at a level of about 0.1–3% of said acid.

2. A method of improving the cold water solubility rate of an acid selected from the group consisting of adipic and fumaric acids which comprises mixing a water soluble ester taken from the group consisting of polyethylene glycol stearate and polyethylene glycol oleate with said acid and finely grinding said mixture, said acid having a particle size of 40–400 U.S. Standard Mesh, said fatty acid ester being employed at a level of about 0.1–3% of said acid.

3. A method of improving the cold water solubility rate of an acid selected from the group consisting of adipic and fumaric acids which comprises coating a water soluble ester taken from the group consisting of polyethylene glycol stearate and polyethylene glycol oleate on acid selected from the group consisting of adipic acid and fumaric acid and finely grinding said coated acid powder, said acid having a particle size of 40–400 U.S. Standard Mesh, said fatty acid ester being employed at a level of about 0.1–3% of said acid.

4. A method according to claim 3 wherein said coated acid powder is ground to the extent that 100% passes through a 300 U.S. Standard Mesh Screen.

5. A method according to claim 3 wherein said fatty acid ester of polyethylene glycol is mixed with propylene glycol.

6. A method according to claim 5 wherein the coating composition of said fatty acid ester of polyethylene glycol and propylene glycol is heated to a temperature of at least room temperature prior to being coated on said acid powder.

7. A method according to claim 5 wherein the coating composition of said fatty acid ester of polyethylene glycol and propylene glycol is heated to a temperature of 120° F. prior to being coated on said acid powder.

8. A method according to claim 3 wherein said fatty acid ester of polyethylene glycol is water soluble polyethylene glycol stearate.

9. An adipic acid-containing composition having an increased rate of solubility in cold water which comprises a finely ground adipic acid powder coated with a water soluble ester taken from the group consisting of polyethylene glycol stearate and polyethylene glycol oleate, said acid having a particle size of 40–400 U.S. Standard Mesh, said fatty acid ester being employed at a level of about 0.1–3% of said acid.

10. A fumaric acid-containing composition having an increased rate of solubility in cold water which comprises a finely ground fumaric acid powder coated with a water soluble ester taken from the group consisting of polyethylene glycol stearate and polyethylene glycol oleate, said acid having a particle size of 40–400 U.S. Standard Mesh, said fatty acid ester being employed at a level of about 0.1–3% of said acid.

11. An adipic acid-containing composition having an increased rate of solubility in cold water which comprises a finely ground adipic acid powder coated with a water soluble ester taken from the group consisting of polyethylene glycol stearate and polyethylene glycol oleate and propylene glycol, said acid having a particle size of 40–400 U.S. Standard Mesh, said fatty acid ester being employed at a level of about 0.1–3% of said acid.

12. A fumaric acid-containing composition having an increased rate of solubility in cold water which comprises a finely ground fumaric acid powder coated with a water soluble ester taken from the group consisting of polyethylene glycol stearate and polyethylene glycol oleate and propylene glycol, said acid having a particle size of 40–400 U.S. Standard Mesh, said fatty acid ester being employed at a level of about 0.1–3% of said acid.

13. An adipic acid-containing composition having an increased rate of solubility in cold water which comprises an adipic acid powder coated with 0.2 to 2.0% of water soluble polyethylene glycol stearate by weight of the adipic acid, said acid having a particle size of 40–400 U.S. Standard Mesh.

14. A fumaric acid-containing composition having an increased rate of solubility in cold water which comprises a fumaric acid powder coated with 0.2 to 2.0% of water soluble polyethylene glycol stearate by weight of the fumaric acid, said acid having a particle size of 40–400 U.S. Standard Mesh.

15. An adipic acid-containing composition having an increased rate of solubility in cold water which comprises an adipic acid powder coated with 0.1 to 3.0% water soluble polyethylene glycol stearate by weight of the adipic acid and 0.1 to 1.0% propylene glycol by weight of the adipic acid, said acid having a particle size of 40–400 U.S. Standard Mesh.

16. A fumaric acid-containing composition having an increased rate of solubility in cold water which comprises a fumaric acid powder coated with 0.1 to 3.0% water soluble polyethylene glycol stearate by weight of the fumaric acid and 0.1 to 1.0% propylene glycol by weight of the fumaric acid, said acid having a particle size of 40–400 U.S. Standard Mesh.

17. An adipic acid-containing composition having an increased rate of solubility in cold water which comprises an adipic acid powder coated with 0.7% water soluble polyethylene glycol stearate by weight of the adipic acid and 0.35% propylene glycol by weight of the adipic acid, said acid having a particle size of 40–400 U.S. Standard Mesh.

18. A fumaric acid-containing composition having an increased rate of solubility in cold water which comprises a fumaric acid powder coated with 0.7% water soluble polyethylene glycol stearate by weight of the fumaric acid and 0.35% propylene glycol by weight of the fumaric acid, said acid having a particle size of 40–400 U.S. Standard Mesh.

No references cited.